US008249544B2

(12) United States Patent
Okabe

(10) Patent No.: US 8,249,544 B2
(45) Date of Patent: Aug. 21, 2012

(54) DIRECTIONAL COUPLER AND RF CIRCUIT MODULE

(75) Inventor: Hiroshi Okabe, Koganei (JP)

(73) Assignee: Renesas Electronics Corporation, Kawasaki-shi (JP)

(*) Notice: Subject to any disclaimer, the term of this patent is extended or adjusted under 35 U.S.C. 154(b) by 427 days.

(21) Appl. No.: 11/828,913

(22) Filed: Jul. 26, 2007

(65) Prior Publication Data

US 2008/0070519 A1 Mar. 20, 2008

(30) Foreign Application Priority Data

Sep. 20, 2006 (JP) ................................ 2006-253850

(51) Int. Cl.
*H04B 1/16* (2006.01)

(52) U.S. Cl. ........ 455/338; 455/292; 455/334; 327/219; 327/228

(58) Field of Classification Search .................. 455/424, 455/425, 456.5, 456.6, 561, 550.1, 575.1, 455/67.11, 67.13, 115.1, 325, 334, 338, 319, 455/80, 282, 327, 292; 333/112, 116, 26, 333/24.2, 185, 32, 33, 238, 109; 327/219, 327/222, 221, 594, 168, 228, 564, 565; 336/200, 336/209, 214, 220, 223, 225
See application file for complete search history.

(56) References Cited

U.S. PATENT DOCUMENTS 3,516,024 A * 6/1970 Lange ........................... 333/116
3,534,299 A * 10/1970 Eberhardt .................... 333/24.2
3,904,991 A * 9/1975 Ishii et al. ..................... 333/116
4,216,446 A * 8/1980 Iwer .............................. 333/112
4,482,874 A * 11/1984 Rubertus et al. .............. 333/185
5,539,362 A 7/1996 Culling
6,018,277 A * 1/2000 Vaisanen ......................... 333/26
6,483,398 B2 11/2002 Nagamori et al.
6,771,141 B2 8/2004 Iida et al.
7,245,192 B2 * 7/2007 Podell ........................... 333/112

(Continued)

FOREIGN PATENT DOCUMENTS

DE 1005146 6/1954

(Continued)

OTHER PUBLICATIONS

Chinese Office Action received in Chinese App. No. 200710136142.0 (and English translation).

(Continued)

*Primary Examiner* — Duc Nguyen
*Assistant Examiner* — Charles Chow
(74) *Attorney, Agent, or Firm* — Miles & Stockbridge P.C.

(57) ABSTRACT

A directional coupler with a high coupling per unit area and small variations in characteristic at manufacturing capable of achieving a high directivity easily and an RF circuit module provided with the directional coupler are achieved. A main-line is provided on a front surface of a multi-layer substrate, a ground plane is provided on a back surface of the multi-layer substrate. On an inner layer immediately under the main-line, two lines in parallel with the main-line are provided, and one line is provided on a layer closer to the ground plane than the two lines. By connecting the two lines and the one line with vias, a sub-line with a shape of a winding of a loop is formed. In the sub-line, a main component of a vector vertically penetrating the loop is horizontal with respect to the ground plane.

5 Claims, 10 Drawing Sheets

U.S. PATENT DOCUMENTS

| | | | | |
|---|---|---|---|---|
| 7,567,147 | B2 * | 7/2009 | Toujo et al. | 333/116 |
| 7,646,261 | B2 * | 1/2010 | Kirkeby | 333/112 |
| 2001/0043130 | A1 | 11/2001 | Nagamori et al. | |
| 2004/0000964 | A1 * | 1/2004 | Killen et al. | 333/116 |
| 2005/0156686 | A1 * | 7/2005 | Podell | 333/116 |

FOREIGN PATENT DOCUMENTS

| | | | |
|---|---|---|---|
| JP | 11-284413 | A | 10/1999 |
| JP | 2002-043813 | A | 2/2002 |
| JP | 2003-133817 | A | 5/2003 |

OTHER PUBLICATIONS

Japanese Office Action dated Mar. 27, 2012 received in Japanese App. No. 2010-124218 (and partial English translation).

* cited by examiner

DIRECTIONAL COUPLER AND RF CIRCUIT MODULE

CROSS-REFERENCE TO RELATED APPLICATION

The present application claims priority from Japanese Patent Application No. JP 2006-253850 filed on Sep. 20, 2006, the content of which is hereby incorporated by reference into this application.

FIELD OF THE INVENTION

The present invention relates to a directional coupler and an RF circuit module, and particularly, to a directional coupler suitable for application detecting transmission signal power in a wireless communicator and an RF circuit module including the directional coupler.

BACKGROUND OF THE INVENTION

An example of a directional coupler which detects an output of an RF circuit module reliably and accurately is disclosed in Japanese Patent Application Laid-Open Publication No. 2002-43813 (Patent Document 1). In this example, the directional coupler that detects the output of the RF circuit module has a structure in which a main-line and a sub-line overlap each other via a dielectric. And, the width of the main-line is narrower than the width of the sub-line, and both side edges of the main-line are positioned inside of both side edges of the sub-line so that the entire width of the main-line faces the sub-line certainly.

And, an example of a small, high-performance coupler with excellent directivity, small insertion loss, and small deterioration in a reflection characteristic is disclosed in Japanese Patent Application Laid-Open Publication No. 2003-133817 (Patent Document 2). In this example, the main-line and the sub-line are arranged so that at least parts of the main-line and the sub-line are approximately parallel with each other in their side surfaces, and therefore, in a side-edge-type directional coupler in which a main-line and a sub-line are coupled in distributed-constant-type, a length of the sub-line is longer than a length of the main-line. And, the main-line is formed of a line in an approximately straight-line shape or a line in an approximately straight-line shape bended at a predetermined position, and has a structure not wound in a spiral fashion. The sub-line is formed of a line in an approximately straight-line shape bended at a predetermined position, and has a structure wound in a spiral fashion.

And, an example of a directional coupler with no deterioration in line impedance of the main-line and the sub-line even with downsizing is disclosed in Japanese Patent Application Laid-Open Publication No. 11-284413 (Patent Document 3). In this example, the main-line composed of a swirling pattern is formed in one layer over a substrate provided with a ground electrode, and a sub-line composed of a swirling pattern is formed in one layer positioned on an upper layer of the layer via an insulating film.

SUMMARY OF THE INVENTION

For example, in a wireless communicator epitomized by a cellular phone, a directional coupler is used to detect transmission signal power. An example of an RF circuit block of a transmission system of a cellular phone complying with GSM (Global System for Mobile Communications) platform, which is a world-standard communication platform, is shown in FIG. 7. A summary of operation of this circuit block is as follows.

First, at a transmission, a transmission signal input from a transmission-signal input terminal 80 of an RF transmission circuit module 90 is amplified by a power amplifier 31 in a power-amplifier IC 30, and impedance-transformed at an output matching network 4. Then, the signal goes through a directional coupler 10, and unwanted harmonics are removed by a low pass filter 50. Then, the signal is emitted from an antenna 70 connected to an antenna terminal 81 via a Single Pole Double Throw (SPDT) switch 60.

Next, at a reception, a received signal received at the antenna 70 is sent to an RF receiver (not shown) through the antenna terminal 81, the SPDT switch 60, and a received-signal output terminal 83. In synchronization with timings of the transmission and the reception, the SPDT switch switches connection between the transmission circuit side and the reception circuit side according to a switch control signal generated by a switch control circuit 34 based on a control signal received by the RF transmission circuit module from a logic circuit (not shown) via a control terminal 82.

Here, in a digital cellular system epitomized by GSM, to avoid interference with other terminal, a power control signal instructing to minimize transmission power is sent from a base station to each cellular-phone terminal. In a cellular phone, since the transmission power is controlled based on this power control signal, part of the transmission-signal power is extracted by a directional coupler 10, and is detected by a detector 33. With reference to the obtained detection voltage, a gain of the power amplifier 31 is adjusted by a bias-voltage control circuit 32 so as to obtain desired transmission power.

In general, the directional coupler is a four-terminal circuit formed of a main-line having two terminals and a sub-line similarly having two terminals, and has a structure in which a part of signal power passing between two terminals of the main-line is extracted by the sub-line electromagnetically-coupled to the main-line from its one terminal. A performance index of the directional coupler is represented by its coupling and directivity. The former is defined by a ratio between the power input to the main-line and the power extracted by the sub-line. The latter is defined by a ratio of power of main-line forward waves (or reflected waves) appeared at two terminals on the sub-line. As the coupling is higher, larger power can be extracted to a sub-line side. However, loss on a main-line side is also increased, and therefore the coupling has to be suppressed to a minimum necessary amount. As for directivity, for the purpose of separation of only a forward wave for detection, which will be described below, higher directivity is better.

Meanwhile in recent years, with an increase in data communication ratio and an increase in number of antenna-mounted terminals, cellular phones are required to increase capability of outputting constant transmission power irrespective of radiation impedance of the antenna, that is, to increase performance under mismatch condition. For example, in a situation where a cellular phone is used for data communication with being placed on a steel table or a user makes a phone call with holding the antenna unit, the radiation impedance of the antenna changes, and part of the transmission signal is reflected at the antenna by impedance mismatch to become a reflected wave returning to the power amplifier side. At this time, if the directional coupler detecting transmission power cannot separate the transmission signal, which is a forward wave from the power amplifier to the antenna side, and the reflected wave from the antenna, in the case where the reflected power from the antenna is increased, for example, it is determined that an output from the power amplifier is increased, and the output of the power amplifier is decreased. As a result, power radiated from the antenna is decreased beyond necessity, and it becomes impossible to communicate with the base station. And, depending on the radiation impedance of the antenna, a phase of the reflected wave becomes opposite to a phase of the forward wave. Therefore, if the forward wave and the reflected wave cannot be separated, power which can be detected is decreased in accordance with an increase in the reflected power, and the output of the power amplifier is increased more than necessary to affect other terminals. Therefore, the directional coupler is required to have capability of separating the forward wave and the reflected wave for detection, that is, high directivity.

The directional coupler for cellular phone is required to be small, as well as other components for cellular phone. To downsize the directional coupler, coupling per unit area has to be high. And, in order to transmit the output of the power amplifier to the antenna without waste, low loss is also required. Other than that, in the case where the directional coupler is manufactured with a ceramic multi-layer substrate process or the like, a characteristic of the directional coupler is required not to change greatly by a layer-to-layer misalignment.

To satisfy requirements described above, for example, in the Patent Document 1, a structure in which the coupling is resistant to change even if a layer-to-layer misalignment occurs is suggested. In the Patent Document 2, a small structure with excellent directivity, small insertion loss, and small deterioration in the reflection characteristic is suggested. Furthermore, in the Patent Document 3, a downsizable structure in which line impedance of the main-line and the sub-line can be prevented from decreasing in comparison with a sandwich structure in which the main-line and the sub-line are sandwiched by a ground electrode is suggested.

FIGS. 10A to 10C show an example of a structure of a directional coupler studied as a base of the present invention. FIG. 10A is a perspective diagram of the directional coupler, FIG. 10B is a cross-sectional diagram thereof, and FIG. 10C is a transparent diagram viewed from top thereof. The example of a structure of FIGS. 10A to 10C reflects features of the Patent Document 1. This directional coupler includes a main-line 11 and a ground plane 25. In parallel with the main-line, a sub-line 12 having a width larger than that of the main-line is provided in an inner layer immediately under the main-line. The example of a structure of this FIG. 10 is a structure in which the main-line and the sub-line are simply layered in the multi-layer substrate. Therefore, such an example of a structure is hereinafter referred to as a stacked type.

FIGS. 11A to 11C show another example of a structure of the directional coupler studied as a base of the present invention. FIG. 11A is a perspective diagram of the directional coupler, FIG. 11B is a cross-sectional diagram thereof, and FIG. 11C is a transparent diagram viewed from top thereof. The example of a structure of FIGS. 11A to 11C reflects features of the Patent Document 2 and 3. This directional coupler includes a main-line 11 and a ground plane 25. And, a line 12*a* formed in an inverted J shape having a portion overlapping the main-line in a parallel manner, a portion vertical to the main-line at its end, and a portion in parallel again with the main-line at a position separated from the main-line is provided. An inner layer further below the line 12*a* is provided with a line 12*b* formed in J shape having a portion in parallel with the main-line at a position separated from the main-line, a portion vertical to the main-line at its another end, and a portion overlapping the main-line in a parallel manner. The line 12*a* and the line 12*b* are connected together with a via 13 to form a sub-line. This example of a structure in FIGS. 11A to 11C has a spiral structure in which the sub-line has a signal input/output end immediately under the main-line and has a loop in parallel with the ground plane. And therefore, such an example of a structure is hereinafter referred to as a horizontal winding type.

By using a directional coupler of the stacked type or the horizontal winding type, it is possible to improve a coupling to some extent. However, with downsizing of cellular phones, further downsizing of directional couplers has been demanded, and a new structure capable of achieving a coupling per unit area that cannot be achieved with the structures of the stacked type and the horizontal winding type has been required.

Therefore, an object of the present invention is to achieve downsizing of the directional coupler and the RF circuit module. Another object of the present invention is to achieve a directional coupler capable of increasing the coupling per unit area more than ever, attaining high directivity easily, and having small variations in characteristics at manufacturing. The above and other objects and novel features of the present invention will become apparent from description of the specification and attached diagrams.

An outline of typical elements of the invention disclosed in this application is described briefly as follows.

A directional coupler of the present invention is a directional coupler comprising a main-line, a sub-line, and a ground plane and is characterized by that the main-line and/or the sub-line form at least one winding of a loop and the loop is disposed so that a main component of a vector vertically penetrating the loop is horizontal with respect to the ground plane. By disposing the loop so that the main component of a vector vertically penetrating the loop is horizontal with respect to the ground plane, a magnetic field can be generated efficiently from the main-line and/or the sub-line, the coupling per unit area is increased, and the downsizing is achieved.

Here, if a first section in which the main-line and/or the sub-line run in parallel in a direction of the same electric current flowing in the main-line and/or the sub-line in maximum times in the loop is disposed at a position separated from the ground plane by a distance longer than that of the other section, that is, a second section, and a portion of the main-line and a potion of the sub-line contributing to a coupling between the main-line and the sub-line are disposed at a position separated from the ground plane by a distance approximately equal to or longer than that of the first section, the portion where a magnetic field is generated most strongly is separated from the ground plane by the longest distance, and therefore an influence of the magnetic field is spread to the maximum. And, since the portion contributing to the coupling is disposed at a position most resistant to an influence of the ground plane, the coupling per unit area can further be increased.

Furthermore, if the portion of the main-line contributing to the coupling is disposed at a position separated from the ground plane by a distance longer than that of the portion of the sub-line contributing to the coupling, so as to overlap the portion of the sub-line contributing the coupling, a projected area of the directional coupler viewed from the portion of the main-line contributing to the coupling toward the ground plane side is minimized. And, the width required for the portion of the main-line contributing to the coupling to have certain characteristic impedance can be maximized, and therefore a transmission loss can be reduced. Furthermore, at this time, if a difference is provided between an entire width of the portion of the main-line contributing to the coupling and an entire width of the portion of the sub-line contributing to the coupling, an effect such that a change in coupling can be suppressed even if a misalignment between the main-line and the sub-line occurs at manufacturing can be achieved.

Note that, in the directional coupler according to the present invention described above, if a structure in which the main-line and the sub-line are formed over or inside the same multi-layer substrate, and the ground plane is disposed over or inside a motherboard mounted with the multi-layer substrate is employed, it is unnecessary to form the ground plane on the multi-layer substrate side. Therefore, with the number of layers of the multi-layer substrate being decreased, the directional coupler can be achieved at a lower cost.

Still further, if the directional coupler according to the present invention described above is formed of a plurality of wiring layers of a module substrate including the ground plane and is configured so that transmission signal power of a power amplifier implemented over the module substrate is detected, a small-sized, high performance RF circuit module can be achieved.

An outline of typical elements of the invention disclosed in this application is, to describe briefly, downsizing of a directional coupler and an RF circuit module can be achieved.

DETAILED DESCRIPTIONS OF THE PREFERRED EMBODIMENTS

In the following embodiments, if required for convenience, the invention is described with a plurality of divided sections or embodiments. However, unless otherwise explicitly pointed out, these sections or embodiments are not unrelated with each other, and have a relation in which one represents a modification example, details, complements, or the like of part or all of the others. Also, in the following embodiments, when the number of elements and others (including a number, numerical value, amount, range, and the like) are referred to, they are not restricted to specific numbers unless otherwise explicitly pointed out, they are apparently restricted to specific numbers in principle or the like, they may be greater or smaller than the specific numbers.

Furthermore, in the following embodiments, it is needless to say that the components (including element steps and others) are not necessarily essential unless otherwise explicitly pointed out, they are apparently essential in principle or the like. Similarly, in the following embodiments, when the shape, position, relation, and the like of the components and the like are referred to, it is assumed that they can include those substantially close to or similar to the shapes and the like, unless explicitly mentioned or such inclusion can be apparently not considered to be the case according to the principle. The same goes for the numerical values and ranges mentioned above.

The embodiments according to the present invention are described in detail below based on the drawings. Note that, in all drawings for describing the present embodiments, the same members are provided with the same reference symbols in principle, and are not repeatedly described.

First Embodiment

Figure 1A:
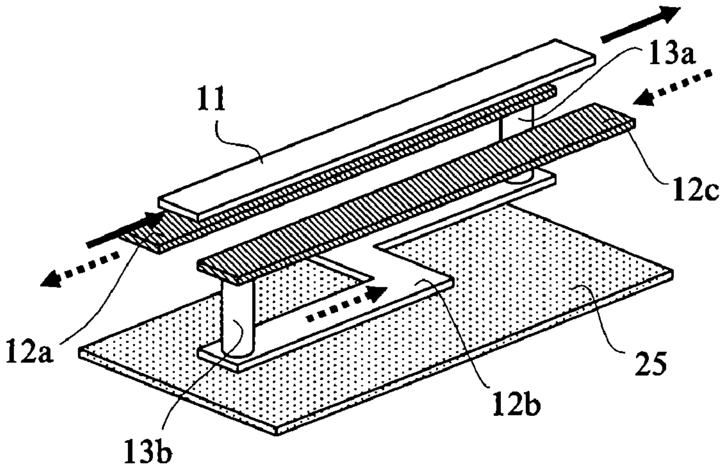
FIG. 1A is a perspective diagram for describing a structure of a directional coupler (vertical winding type) according to a first embodiment of the present invention.
Figure 1B:
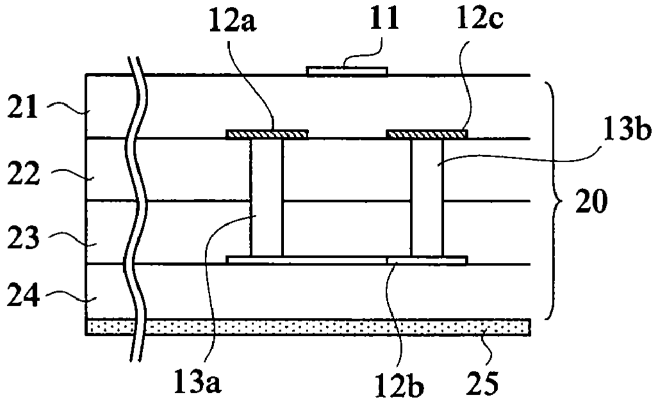
FIG. 1B is a cross-sectional diagram for describing the structure of the directional coupler (vertical winding type) according to the first embodiment of the present invention.
Figure 1C:
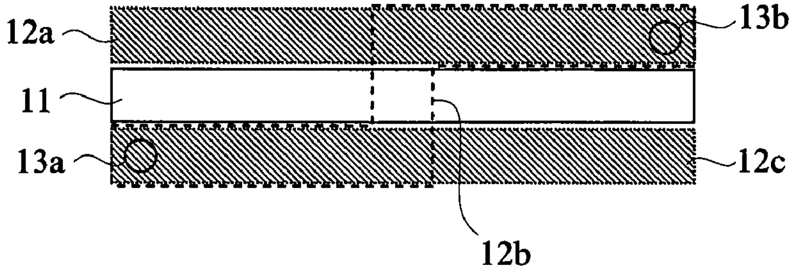
FIG. 1C is a transparent diagram viewed from top for describing the structure of the directional coupler (vertical winding type) according to the first embodiment of the present invention.

FIGS. 1A to 1C show a structure of a directional coupler according to a first embodiment of the present invention. FIG. 1A is a perspective diagram of the directional coupler, FIG. 1B is a cross-sectional diagram thereof, and FIG. 1C is a top transparent diagram viewed from top thereof. As can be seen from FIG. 1B, the directional coupler is formed of a multi-layer substrate 20 composed of four insulating layers 21 to 24. In the first embodiment, a glass ceramic multi-layer substrate having a relative permittivity of 7.8 and tan δ of 0.002 is used for the multi-layer substrate. Each insulating film has a thickness of 150 μm. The multi-layer substrate 20 is provided with a ground plane 25 on the back surface. Conductivity of a wiring conductor including the ground plane is $4\times10^7$S/m, and a thickness thereof is 15 μm. A main-line 11 is provided on a front surface, which is an opposite side of the back surface where the ground plane of the multi-layer substrate is provided. A sub-line is formed by connecting two lines 12*a* and 12*c* provided to an inner layer immediately under the main-line so as to be parallel with the main-line, and a line 12*b* provided to a layer closer to the ground plane than these layers with vias 13*a* and 13*b*. This connection is such that directions of currents flowing in the lines 12*a* and 12*c* are equal to each other. That is, the sub-line configured of these lines forms a winding of a loop having a signal input/output end in the inner layer immediately under the main-line 11.

Here, as can be seen from FIG. 1A, since the loop of the sub-line draws a loop in a vertical direction with respect to the ground plane 25, a main component of a vector vertically penetrating the loop of the sub-line is horizontal with respect to the ground plane 25. In the first embodiment, a width of the main-line 11 and a the width of each of the sub-lines 12*a*, 12*b*, and 12*c* are all 100 μm, and a distance between the sub-lines 12*a* and 12*c* is also 100 μm. Furthermore, a line length of the main-line contributing to the coupling, that is, a line length of a portion shown in FIGS. 1A to 1C, is 2 mm. Since the sub-line is wound vertically to the ground plane in the directional coupler according to the first embodiment, the type of the directional coupler is hereinafter referred to as a vertical winding type.

Figure 2A:
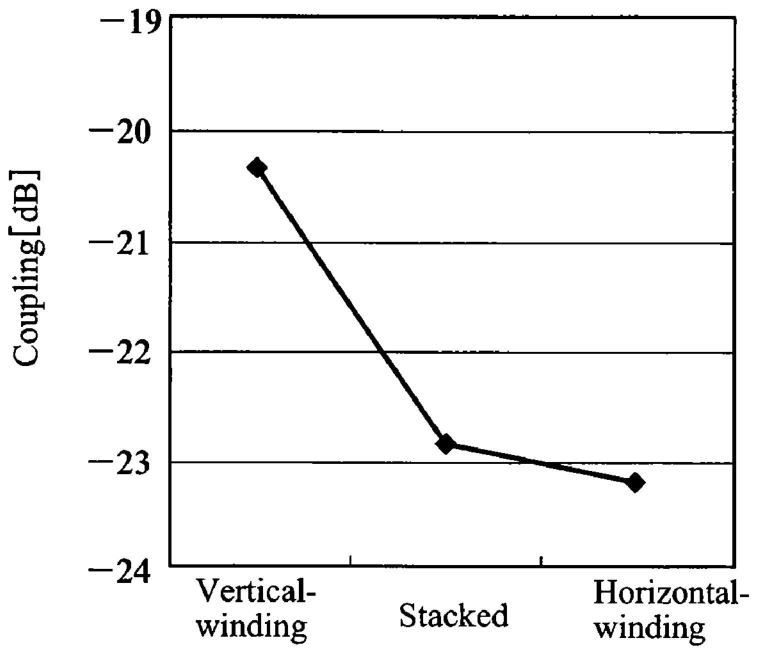
FIG. 2A is a comparison diagram of coupling for describing effects of the directional coupler (vertical winding type) according to the first embodiment of the present invention.
Figure 2B:
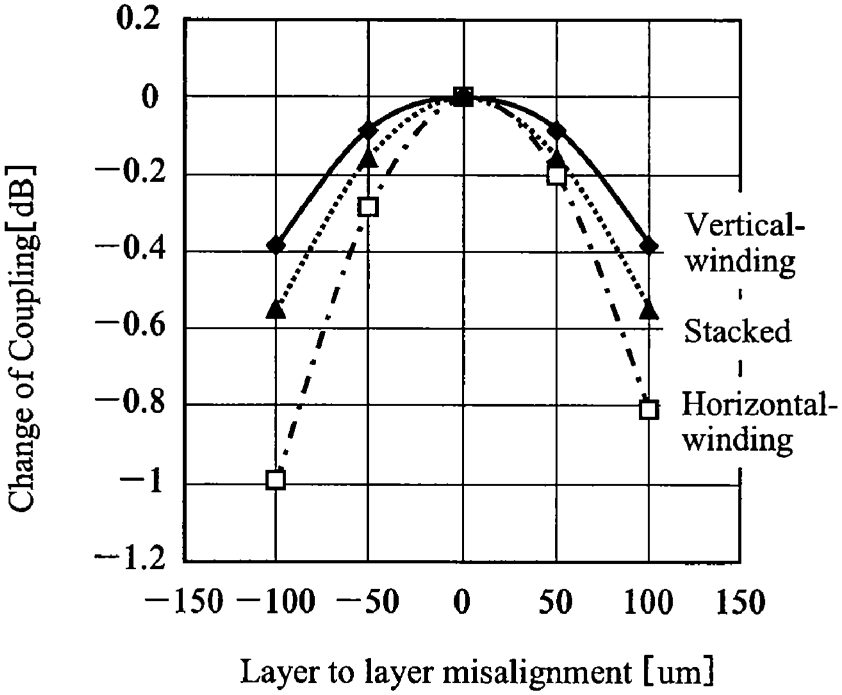
FIG. 2B is a comparison diagram of change of coupling for describing effects of the directional coupler (vertical winding type) according to the first embodiment of the present invention.
Figure 10A:
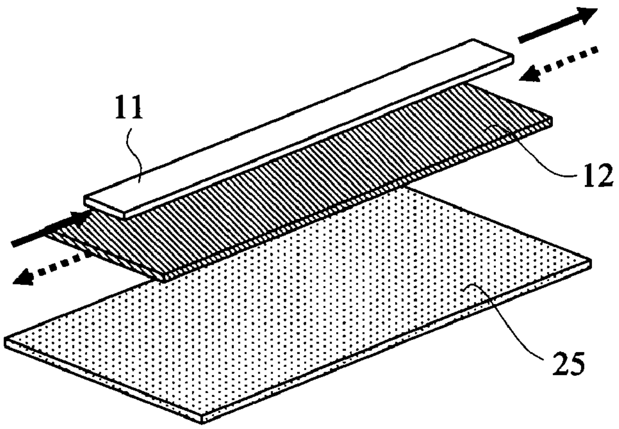
FIG. 10A is a perspective diagram for describing a structure of a directional coupler (stacked type) studied as a base of the present invention.
Figure 10B:
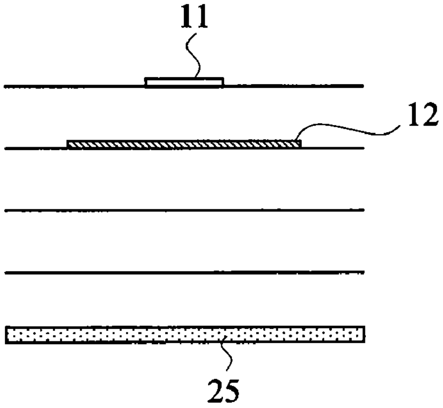
FIG. 10B is a cross-sectional diagram for describing the structure of the directional coupler (stacked type) studied as a base of the present invention.
Figure 10C:
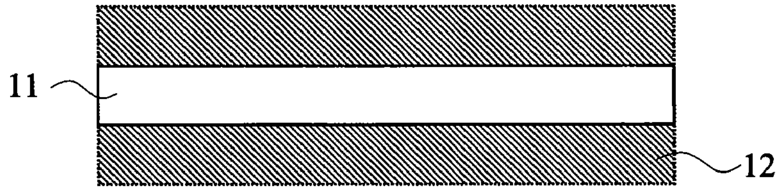
FIG. 10C is a transparent diagram viewed from top for describing the structure of the directional coupler (stacked type) studied as a base of the present invention.
Figure 11A:
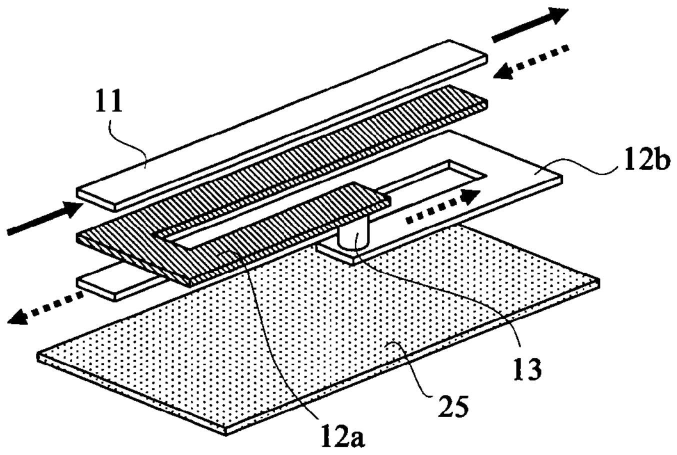
FIG. 11A is a perspective diagram for describing a structure of another directional coupler (horizontal winding type) studied as a base of the present invention.
Figure 11B:
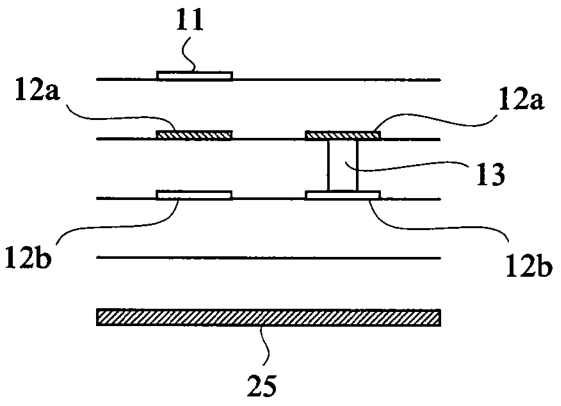
FIG. 11B is a cross-sectional diagram for describing the structure of the directional coupler (horizontal winding type) studied as a base of the present invention.
Figure 11C:
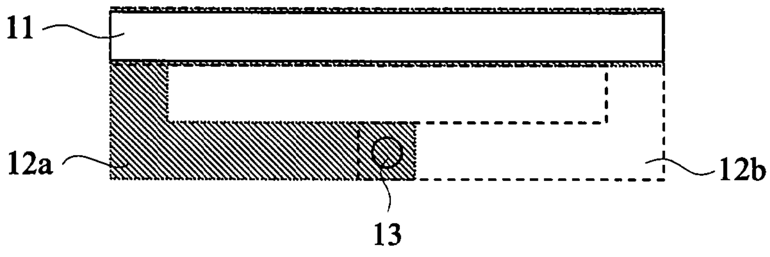
FIG. 11C is a transparent diagram viewed from top for describing the structure of the directional coupler (horizontal winding type) studied as a base of the present invention.

Next, effects achieved by the directional coupler of the vertical winding type according to the first embodiment compared with the directional couplers of the stacked type and the horizontal winding type shown in FIGS. 10A to 10C and 11A to 11C are described with reference to FIGS. 2A and 2B. FIG. 2A is a comparison diagram of coupling, and FIG. 2B is a comparison diagram of change of coupling. Either of these graphs represents results obtained through a three-dimensional electromagnetic field analysis. Note that, for this comparison, it is assumed that respective examples of structures in FIGS. 1A to 1C, FIGS. 10A to 10C, and FIGS. 11A to 11C are formed using a multi-layer substrate having the same structure as that of FIGS. 1A to 1C. That is, a width of the main-line 11 in FIGS. 10A to 10C and FIGS. 11A to 11C is 100 μm, and a width of the sub-line 12 in FIGS. 10A to 10C is 300 μm. Furthermore, widths of the sub-lines 12*a* and 12*b* in FIGS. 11A to 11C are 100 μm, and a distance between a portion of the sub-line 12*a* and 12*b* in parallel with the main-line and a potion of the sub-line 12*a* and 12*b* overlapping the main-line in parallel is 100 μm.

According to FIG. 2A, it can been seen that, though all the examples are formed in the same multi-layer substrate and the same area, the vertical winding type can achieve higher coupling by near 3 dB compared with the other types. This is because of the fact that, in the vertical winding type, a main component of a magnetic field vector vertically penetrating the loop of the sub-line is horizontal with respect to the ground plane, and therefore the sub-line can receive the magnetic field generated by the main-line efficiently. In a microstrip line structure of combination of the main-line and the ground plane as shown in FIG. 1A, it is known that, for example, an electromagnetic field distribution in the case where a current is caused to flow in the main-line in a direction represented by solid arrows in FIG. 1A is equal to an electromagnetic field distribution in the case where the ground plane does not exist and an image current flows at a position symmetric to the main-line with respect to the ground plane in a direction reverse to the direction represented by the solid arrows. The magnetic field generated by the main-line and the magnetic field generated by the image current have a relation of strengthening each other in a direction horizontal to the ground plane between the position of the main-line and the position where the image current flow. In the vertical winding type, since the loop of the sub-line is vertical to the ground plane, the sensitivity is highest for a magnetic field horizontal to the ground plane. Therefore, the structure of the vertical winding type where a strong magnetic field exists in a direction of a high sensitivity can be said to be a structure in which a magnetic field can be received most efficiently for the microstrip line structure formed of the main-line and the ground plane.

Furthermore, in the example of the structure in FIGS. 1A to 1C, the line portions 12*a* and 12*c* forming the sub-line immediately under the main-line run in parallel. And therefore, the loop formed of the sub-line can be converted to approximately 1.5 windings, and magnetic field sensitivity is further increased. By contrast, in the stacked type, the main-line and the sub-line merely run in parallel. Therefore, to increase the magnetic field sensitivity, the line length has to be increased. And, in the horizontal winding type, since the loop of the sub-line is horizontal to the ground plane, the sensitivity is highest for a magnetic field vertical to the ground plane. However, in the case where the ground plane exists, the magnetic field generated by the main-line and the magnetic field generated by the image current have a relation of weakening each other in a direction vertical to the ground plane, and therefore a magnetic field cannot be detected efficiently.

Note that, in the case of the horizontal winding type, if the ground plane does not exist, it can be assumed that characteristic thereof is close to that of the vertical winding type without a ground plane. However, in actuality, it is almost impossible to assume the structure without a ground plane. In general, in RF circuits, in order to achieve a stable performance, a ground plane serving as a reference voltage is provided, and a transmission line, such as a microstrip line or a strip line, is provided for the ground plane. As for some chip components, such as a directional coupler and a frequency filter, some components have no ground plane, and however a motherboard on which the component mounted has a ground plane thereon or therein. Therefore, in a device-assembled state, a ground plane exists in some form.

And, in the structure of FIGS. 1A to 1C, for example, if a section where the sub-line run in parallel in a direction of the same electric current in maximum times is taken as a first section (corresponding to the lines 12*a* and 12*c*) and the other section is taken as a second section (corresponding to the line 12*b*), the first section is disposed at a position separated from the ground plane by a longer distance than the second section and a portion of the main-line and the sub-line contributing to the coupling between the main-line and the sub-line is also disposed at a position separated from the ground plane. By disposing the first section at a position separated from the ground plane by a longer distance than the second section, influence of the magnetic field can be widened to maximum. And, by disposing the portion contributing to the coupling (that is, a portion where the main-line and the sub-line are adjacently disposed for electromagnetic coupling, corresponding to a portion of the main-line 11 and the lines 12*a* and 12*c* in FIGS. 1A to 1C) at a position separated from the ground plane, the structure is resistant to influence of the ground plane. Therefore, for example, the coupling per unit area can be further increased in comparison with the case of the structure in which the ground plane 25 is disposed on an upper side of the main-line 11 in FIGS. 1A to 1C.

Next, according to FIG. 2B, though all the examples are formed in the same multi-layer substrate and the same area, it can be found that the vertical winding type, has a minimum amount of change in coupling in comparison with the others in the case where a layer-to-layer misalignment occurs. In the vertical winding type, a width obtained by adding a width of the line 12*a* and that of the line 12*c* forming the sub-line positioned on a layer immediately under the main-line is larger than a width of the main-line by 200 μm. Therefore, in the case where the main-line is misaligned to either one of the lines 12*a* and 12*c*, a capacitive coupling with the line from which the main-line is separated is decreased, but a capacitive coupling with the line to which the main-line comes closer to is increased. With this, a change in the capacitive coupling between the main-line and the entire sub-line can be suppressed even if a layer-to-layer misalignment occurs, and as a result, a change in coupling is also suppressed.

By contrast, in the stacked type, a width of the sub-line is larger than that of the main-line by 200 μm. Therefore, even if a slight layer-to-layer misalignment occurs, the main-line is not shifted from a position over the sub-line. Therefore, the amount of change in coupling is the smallest, next to the vertical winding type. However, in the horizontal winding type, if the layer-to-layer misalignment occurs, the magnetic coupling and the capacitive coupling are both decreased, and therefore the coupling is decreased significantly. Furthermore, since a difference in change of capacitive coupling occurs depending on whether the main-line comes closer to or goes away from the center of the loop of the sub-line, a difference in change of coupling occurs depending on the direction of the misalignment.

As described above, by using the directional coupler according to the first embodiment, the coupling per unit area can be increased in comparison with a directional coupler of the stacked type or the horizontal winding type, and therefore downsizing can be achieved. And, even if the layer-to-layer misalignment occurs at manufacturing, a change in coupling is small, and therefore high reliability and low cost associated with improvement in manufacturing yield can be achieved.

Second Embodiment

A directional coupler according to a second embodiment has a structure in which the directional coupler according to the first embodiment is used and directivity is adjusted further. The structure of the directional coupler according to the second embodiment is similar to that of the directional coupler according to the first embodiment in the number of the substrate layers, the insulating layer, the thickness and material of the conductor, the line width of the sub-line, and the line length of the main-line contributing to the coupling. A width of the main-line and a distance between portions running parallel of lines forming the sub-line are parameters for improving the directivity.

Figure 3A:
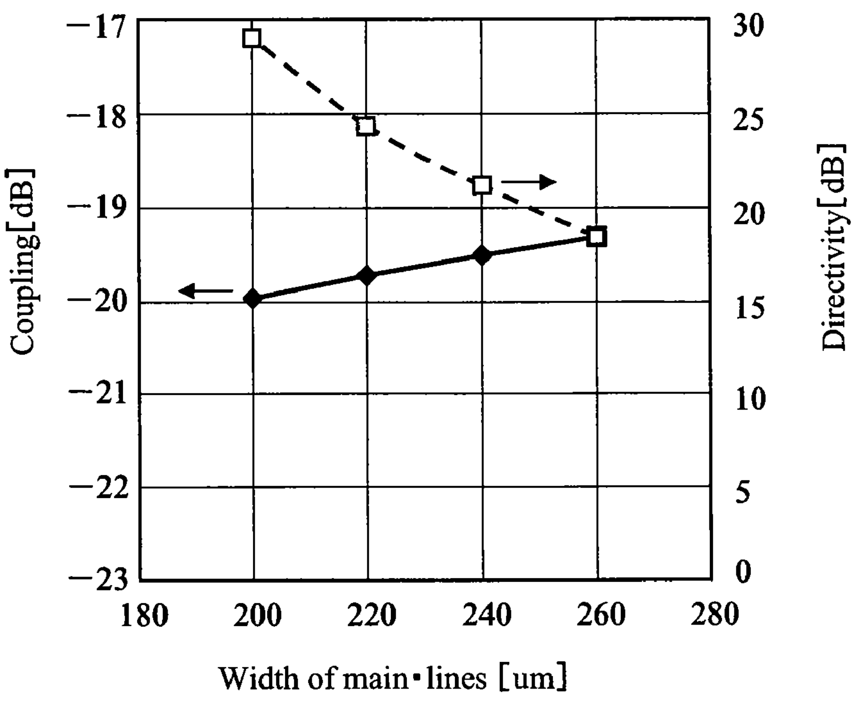
FIG. 3A is a diagram showing dependence of coupling and directivity on width of a main-line for describing a scheme of adjusting directivity of a directional coupler according to a second embodiment of the present invention.
Figure 3B:
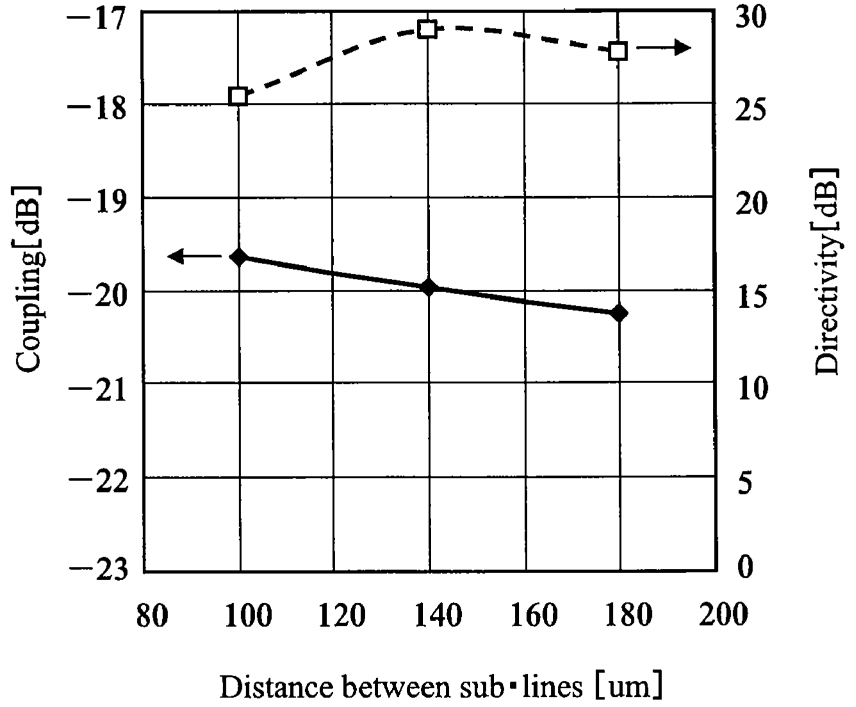
FIG. 3B is a diagram showing dependence of coupling and directivity on distance between sub-lines for describing the scheme of adjusting the directivity of the directional coupler according to the second embodiment of the present invention.

FIG. 3A is a graph showing dependence of the coupling and the directivity on the width of the main-line. FIG. 3B is a graph showing dependence of the coupling and the directivity on the distance between the sub-lines. Both of these graphs represent results obtained through a three-dimensional electromagnetic field analysis. FIG. 3A represents results in the case of the distance between the sub-lines of 140 μm. According to the results, it can be found that as the width of the main-line is narrowed from 260 μm to 200 μm, the coupling is slightly decreased, whilst the directivity is improved. In the second embodiment, target directivity is set at 25 dB. Therefore, it can be found that the target can be satisfied with a sufficient margin by setting the width of the main-line at 200 μm. Next, FIG. 3B represents the results with the width of the main-line of 200 μm. According to the results, it can be found that as the distance between the sub-lines is widened from 100 μm to 180 μm, the coupling is slightly decreased, whilst the directivity takes a peak value at the distance between the sub-lines of 140 μm.

As described above, by using the directional coupler according to the second embodiment, in addition to the various effects described in the first embodiment, the directivity required for achieving high performance under mismatch condition can be obtained easily by adjusting the directivity with two parameters, that is, the width of the main-line and the distance between the sub-lines.

In general, directivity of a directional coupler is determined by balance between a magnetic coupling (inductive coupling) and an electric coupling (capacitive coupling) between the main-line and the sub-line. To increase a magnetic coupling in the directional coupler according to the second embodiment, area of the loop or the number of windings of the sub-line is increased. To increase the electric coupling, the overlapping width between the main-line and the sub-line is increased, or thickness of the insulating layer 21 between the main-line and the sub-line is decreased. Among these, in the second embodiment, the line width is picked up, which is relatively easily adjustable. However, as a matter of course, the directivity can be adjusted with other parameters.

Third Embodiment

Figure 4A:
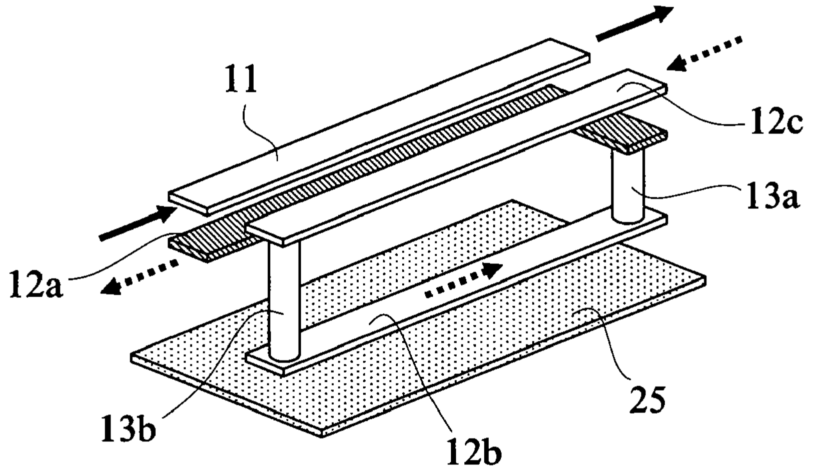
FIG. 4A is a perspective diagram for describing a structure of a directional coupler (paralleled vertical winding type) according to a third embodiment of the present invention.
Figure 4B:
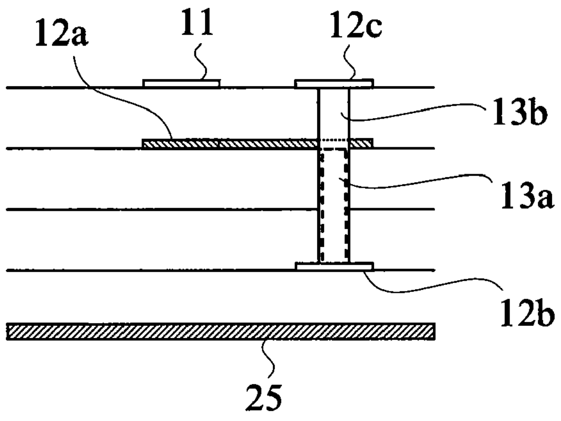
FIG. 4B is a cross-sectional diagram for describing the structure of the directional coupler (paralleled vertical winding type) according to the third embodiment of the present invention.
Figure 4C:
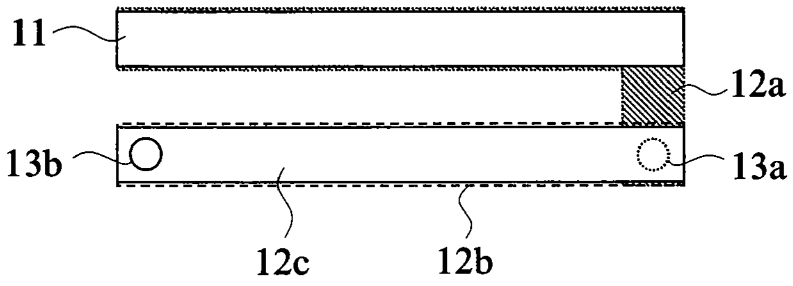
FIG. 4C is a transparent diagram viewed from top for describing the structure of the directional coupler (paralleled vertical winding type) according to the third embodiment of the present invention.

A directional coupler according to a third embodiment is achieved by further applying the structure of the vertical winding type described in the first embodiment. FIGS. 4A to 4C show an example of a structure of a directional coupler according to the third embodiment of the present invention. FIG. 4A is a perspective diagram of the directional coupler, FIG. 4B is a cross-sectional diagram thereof, and FIG. 4C is a top transparent diagram viewed from top thereof. The number of substrate layers, insulating layer, thickness and material of the conductor, width of the main-line and the sub-line, a line length of the main-line contributing to coupling, and the like forming the directional coupler according to the third embodiment are identical to those according to the first embodiment. Difference between the third embodiment and the first embodiment is that, in the third embodiment, as shown in FIGS. 4A to 4C, a line 12*a* of the sub-line is provided on a layer immediately under the main-line 11 so as to overlap with the main-line 11, and a line 12*c* of the sub-line is provided on a front layer in parallel with the main-line 11.

The lines 12*a* and 12*c* are connected together with the line 12*b* provided on a layer close to a ground plane 25, and vias 13*a* and 13*b*, and therefore, as a whole, the sub-line having a loop approximately vertical with respect to the ground plane is formed. In other words, a main component of the vector vertically penetrating this loop is a component in a horizontal direction with respect to the ground plane, rather than that in a vertical direction. In the directional coupler according to the third embodiment, the sub-line is vertically wound with respect to the ground plane and part of the sub-line runs in parallel with the main-line on a front layer, and therefore this type is hereinafter referred to as a paralleled vertical winding type. Note that, since a distance between the main-line 11 and the line 12*c* is 100 μm, a projected area of the directional coupling according to the third embodiment viewed from the front layer is identical to that of the first embodiment.

Figure 5A:
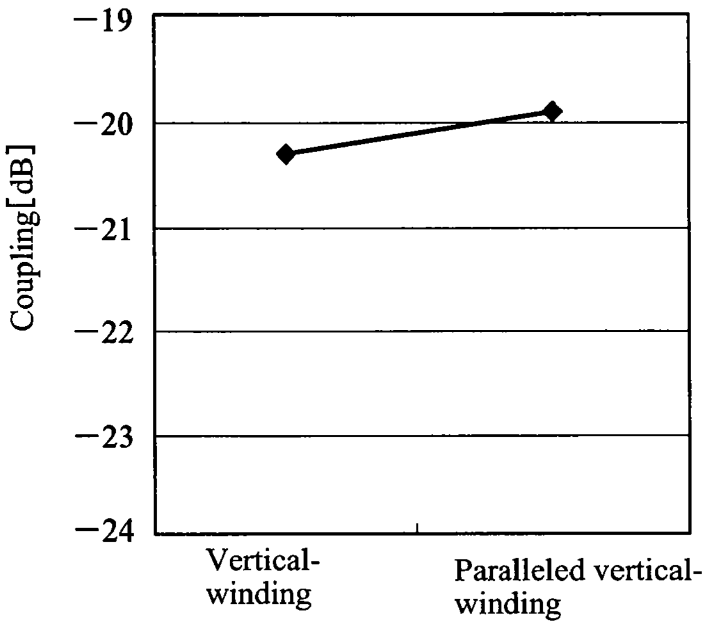
FIG. 5A is a comparison diagram of coupling for describing effects of the directional coupler (paralleled vertical winding type) according to the third embodiment of the present invention.
Figure 5B:
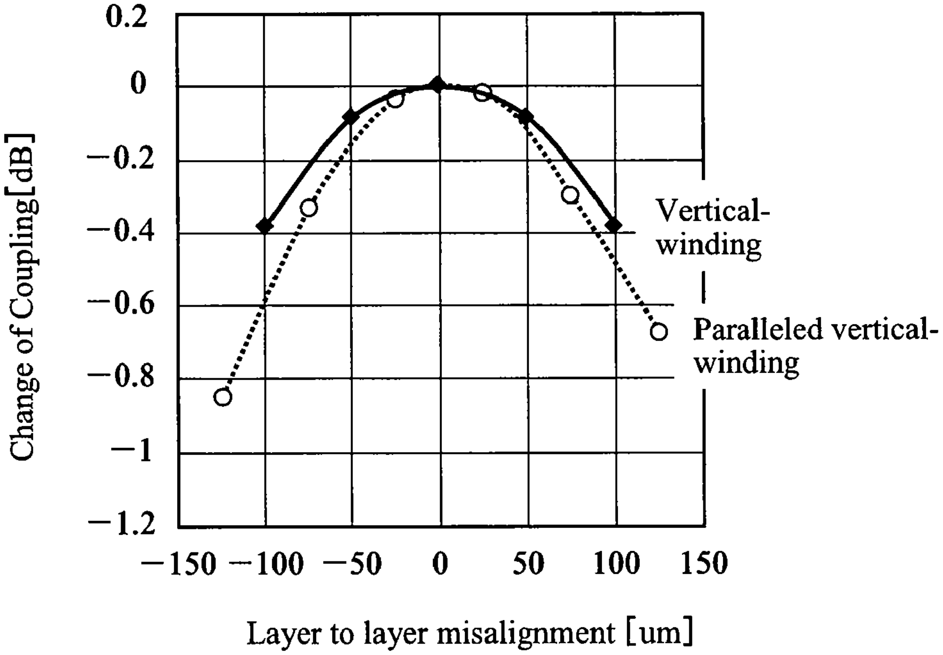
FIG. 5B is a comparison diagram of change of coupling for describing effects of the directional coupler (paralleled vertical winding type) according to the third embodiment of the present invention.

Comparison of characteristic of the paralleled vertical winding type and the vertical winding type described in the first embodiment based on the result of a three-dimensional electromagnetic field analysis are shown in FIGS. 5A and 5B. From FIG. 5A, it can be found that the coupling of the paralleled vertical winding type is higher than that of the vertical winding type. This is because the effective area of the loop formed of the sub-line is increased by providing the lines 12*c* of the sub-line on the front layer. By contrast, from FIG. 5B, it can be found that an amount of change in coupling in the case where a layer-to-layer misalignment occurs of the paralleled vertical winding type is larger than that of the vertical winding type. However, in comparison with the results shown in FIG. 2B, it can be found that the amount of change in coupling of the paralleled vertical winding type is comparable with that of the stacked type. The reason can be considered as follows. That is, since the main-line 11 and the line 12*a* of the sub-line are overlapping each other with the same width, the amount of capacitive coupling is changed according to the layer-to-layer misalignment. However, since the main-line 11 and the line 12*c* of the sub-line are on the same layer, and are not affected by the layer-to-layer misalignment. Therefore, by averaging both, the amount of change in coupling is not so large.

As has been described above, by using the directional coupler according to the third embodiment, the coupling per unit area can be further increased in comparison with the case of the vertical winding type described in the first embodiment, and further downsizing can be achieved. Note that, the directional coupler according to the third embodiment is, in comparison with the directional coupler according to the first embodiment in practical use, suitable for the case where the directional coupler is used in a system with a sufficient margin of the amount of change in coupling or the case in which the directional coupler can be manufactured through a multi-layer-substrate manufacturing process with a small layer-to-layer misalignment.

Fourth Embodiment

Figure 6:
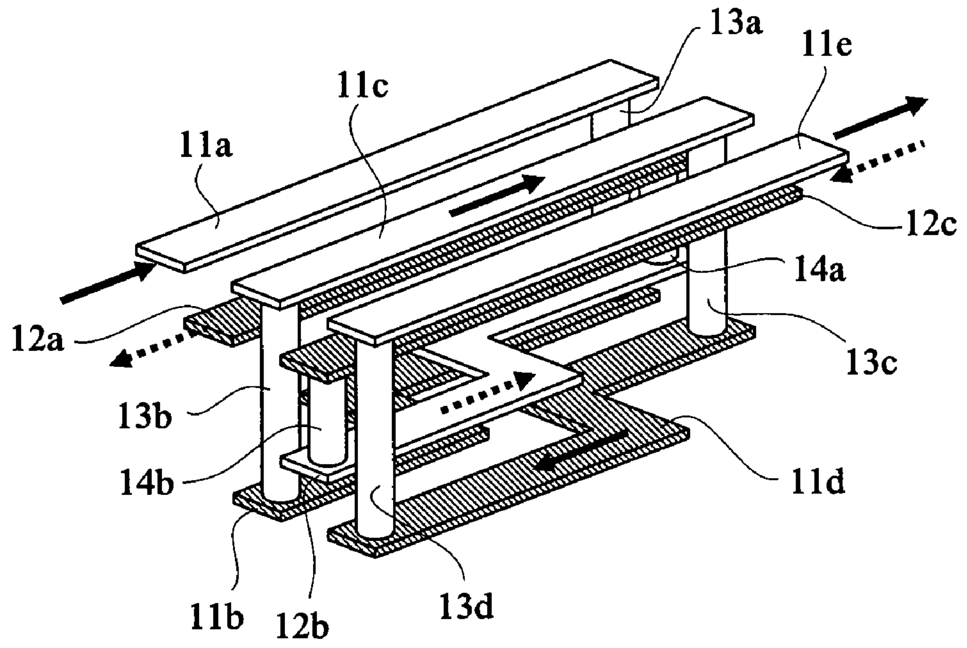
FIG. 6 is a perspective diagram for describing a structure of a directional coupler according to a fourth embodiment of the present invention.

A directional coupler according to a fourth embodiment is achieved by applying the structure of the vertical winding type described in the first embodiment to a main-line and a sub-line. FIG. 6 is a perspective diagram of an example of a structure of the directional coupler according to the fourth embodiment of the present invention. The directional coupler according to the fourth embodiment includes two lines 12*a* and 12*c* in parallel to each other facing a ground plane (not shown), three lines 11*a*, 11*c*, and 11*e* disposed in parallel with the two lines at a position separated from the ground plane by a distance longer than a distance between the two lines and the ground plane, one line 12*b* disposed between the two lines and the ground plane, and other two lines 11*b* and 11*d* disposed between the one line and the ground plane. And, by connecting the two lines 12*a* and 12*c* and the one line 12*b* with vias 14*a* and 14*b* so that directions of currents flowing in the two lines are equal, a sub-line is formed. Furthermore, by connecting the three lines 11*a*, 11*c*, and 11*e* and the other two lines 11*b* and 11*d* with vias 13*a*, 13*b*, 13*c*, and 13*d* so that directions of currents flowing in the three lines are equal, a main-line is formed.

By employing such a structure, a structure in which each of the main-line and the sub-line has a loop vertical with respect to the ground plane, that is, a structure having high magnetic-coupling efficiency can be achieved. A coupling of the directional coupler according to the fourth embodiment can be adjusted with a length of a portion of the main-line and a potion of the sub-line contributing to the coupling (that is, the magnitude of one winding of a loop in the main-line and the sub-line), the number of windings of each loop, a distance between the main-line and the sub-line, and others. Note that, at this time, for example, since a line portion vertical to the loop (in FIG. 6, corresponding to step portions at the stepwise lines 11*b*, 11*d*, and 12*b*) does not contribute to the coupling, it is not included in magnitude of one winding. Also, the number of windings of the loop may include 0, meaning that the main-line does not form a loop similarly to the case of FIGS. 1A to 1C. Note that, in the fourth embodiment, the length of the main-line is longer than the length of the sub-line. This is because it is considered that an effective utilization of the module area is achieved in the case where a long line is required for adjusting a phase in the directional coupler or the like, by using the main-line of the directional coupler also as the long line.

Fifth Embodiment

Figure 7:
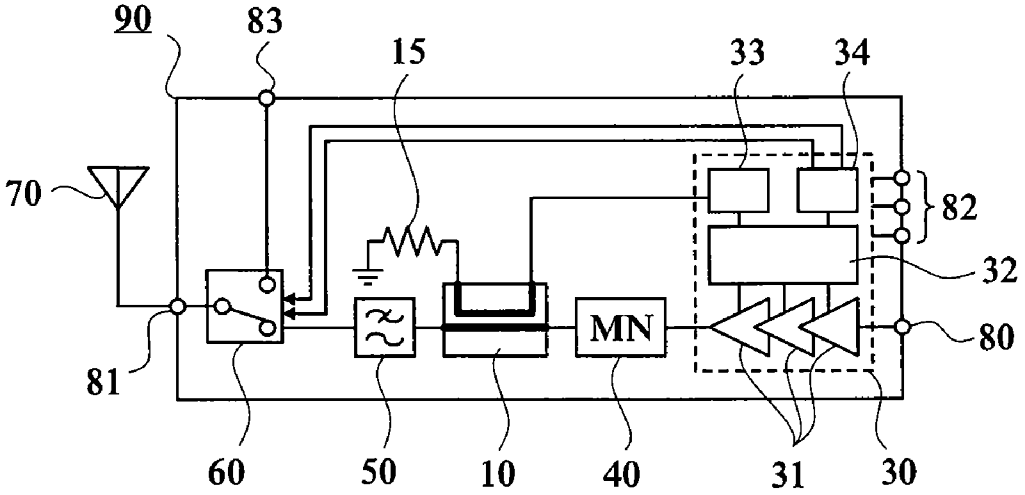
FIG. 7 is a block diagram of an RF circuit of a transmission system of a typical cellular phone.
Figure 8A:
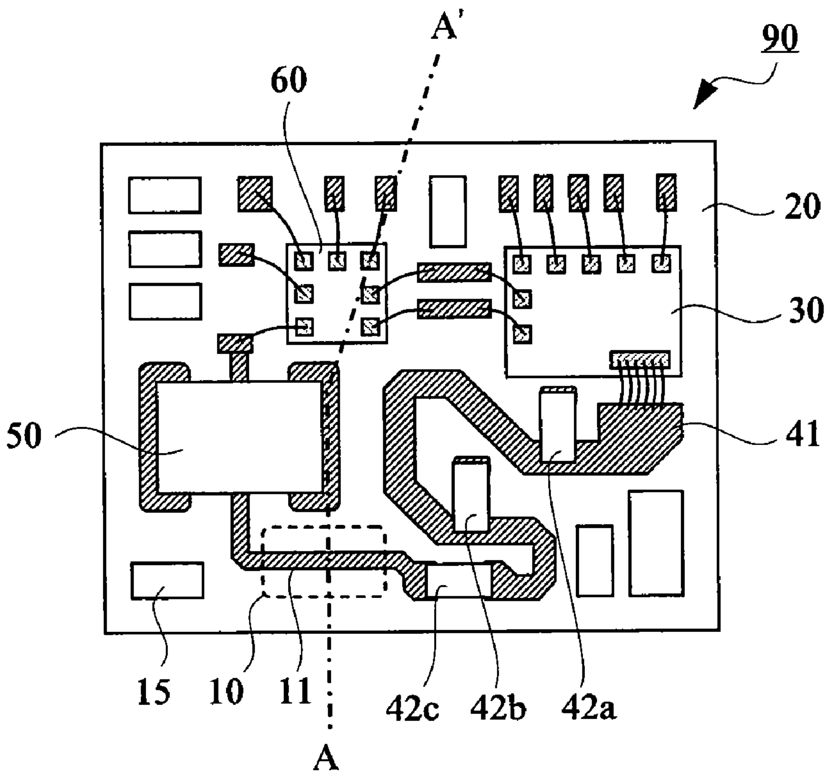
FIG. 8A is a layout diagram of an RF circuit module for describing a fifth embodiment of the present invention.
Figure 8B:
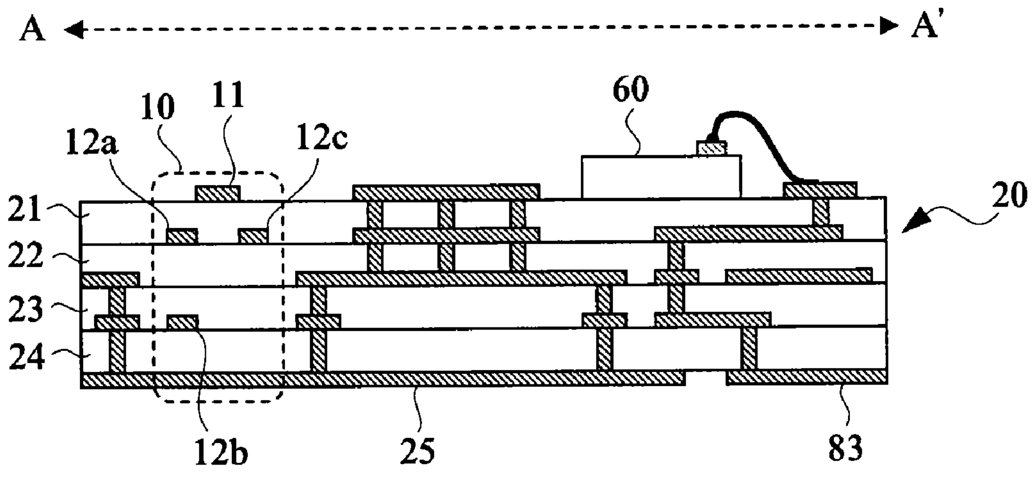
FIG. 8B is a cross-sectional diagram of the RF circuit module for describing the fifth embodiment of the present invention.

In an RF circuit module according to a fifth embodiment, the directional coupler of the vertical winding type described in the first embodiment and the like is formed in a module substrate (a multi-layer substrate) of an RF circuit module having a function of an RF circuit block of a transmission system shown in FIG. 7. FIGS. 8A and 8B show an example of a structure of the RF circuit module according to the fifth embodiment of the present invention. FIG. 8A is a layout diagram, and FIG. 8B is a cross-sectional diagram along an A-A' line in FIG. 8A. In FIGS. 8A and 8B, a directional coupler 10 includes a main-line 11 and a sub-line formed of lines 12*a* to 12*c*, and is formed of a wiring layer of a multi-layer substrate 20. By a high coupling per unit area described in the first embodiment, the occupied area of the directional coupler 10 is small in an RF circuit module 90, and therefore the entire RF circuit module can be downsized.

And, since a change in coupling of the directional coupler 10 is small with respect to a layer-to-layer misalignment at manufacturing of a module substrate, a superfluous coupling margin served for the change in coupling can be suppressed, and therefore the coupling can be reduced as small as possible. With this, wasting superfluous power from an output of the power amplifier passing through the main-line is prevented, and therefore transmission power efficiency of the entire RF circuit module is improved.

Here, the main-line 11 in the directional coupler 10 has both ends. The one end is connected to an output matching networks formed of a transmission line 41 and chip capacitances 42*a* to 42*c*. The other end is connected to a low pass filter 50. The sub-line has both ends. The one end is connected to a detector in a power amplifier IC 30 and the other is connected to a terminator 15. If the directivity of the directional coupler 10 is sufficiently high, part of signal power proceeding in the main-line 11 from the output matching circuit to a low pass filter 50 side mostly appears on a detector side of the sub-line, and hardly appears on a terminator 15 side. And, in the case where reflection occurs on an antenna side, a reflected-wave component appearing in the sub-line mostly appears on the terminator 15 side, and hardly appears on the detector side. Therefore, for example, by adjusting the directivity through a method described in the second embodiment, a small directional coupler with sufficient directivity can be achieved, and a small RF circuit module with high performance can be obtained.

Here, the example in which the directional coupler 10 is formed on or inside the multi-layer substrate 20 provided with the ground plane 25 has been described. Alternatively, for example, a method in which one multi-layer substrate component provided with the main-line 11 and the sub-line formed of the lines 12*a* to 12*c* is manufactured, and this component is implemented as a sub-board on the multi-layer substrate 20 as a motherboard can be employed. Also in this case, since the sub-line in the sub-board has a vertical-winding structure with respect to the ground plane 25 of the multi-layer substrate 20 as a motherboard, effects similar to those in the first embodiment and others can be obtained.

Sixth Embodiment

Figure 9:
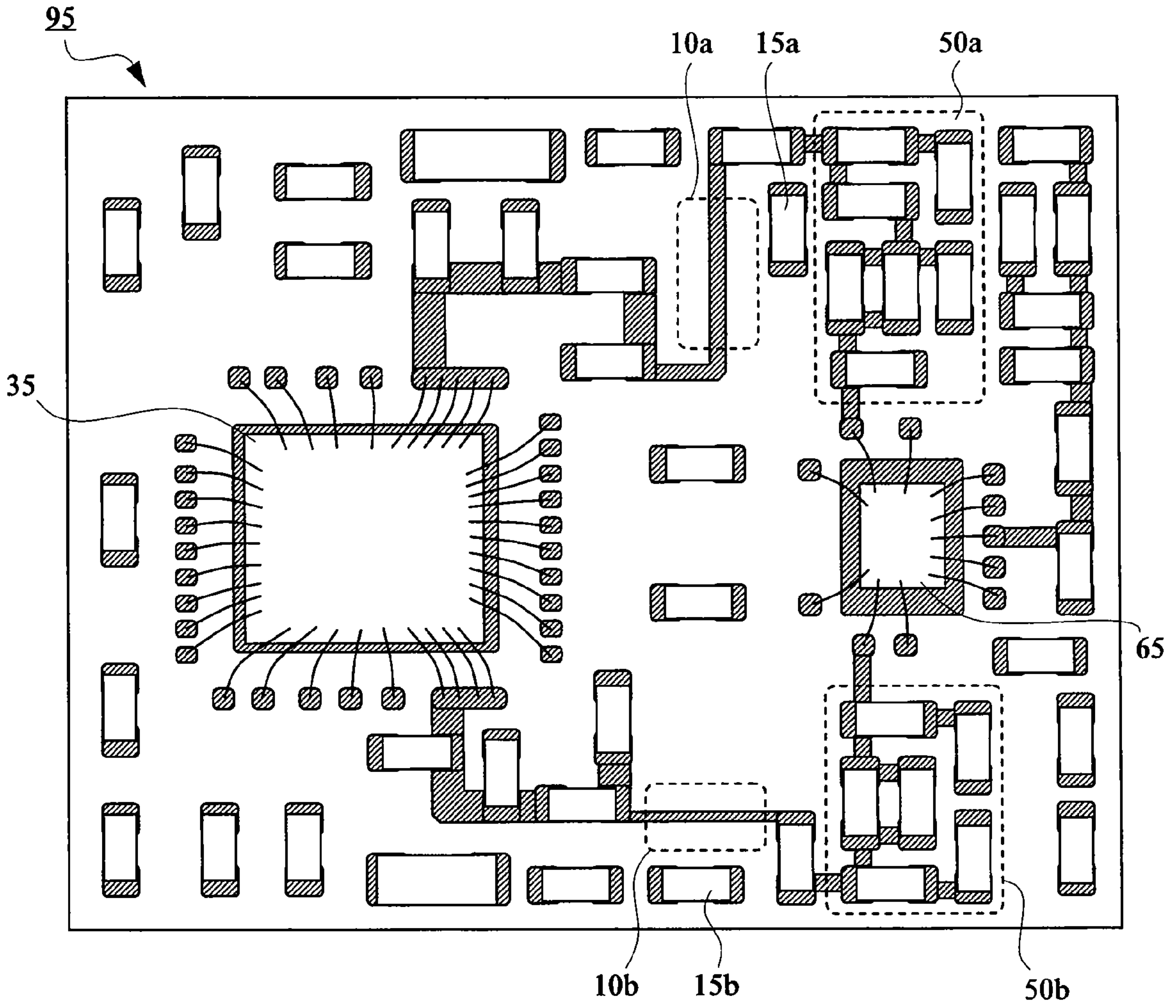
FIG. 9 is a layout diagram of a multi-band RF circuit module for describing a sixth embodiment of the present invention.

An RF circuit module according to a sixth embodiment has a structure in which two directional couplers of the vertical winding type described in the first embodiment and the like are formed in a module substrate of a multi-band RF circuit module corresponding to two systems of the RF circuit block of the transmission system shown in FIG. 7. FIG. 9 is a layout diagram showing an example of a structure of the RF circuit module according to the sixth embodiment of the present invention. In a multi-band RF circuit module 95, a dual-band power amplifier IC 35 including power amplifiers corresponding to the frequencies of the two systems are mounted. And outputs from the power amplifiers of the two systems pass through their corresponding output matching circuits respectively to enter low pass filters 50*a* and 50*b* for removal of harmonics, and are then guided via a Single Pole 4 Throw (SP4T) switch 65 to an antenna terminal (not shown).

The SP4T switch 65 has a function of switching a connection between each of two transmission systems and two reception systems and the antenna. Between each of the output matching circuits and each of the low pass filters for the two transmission systems, directional couplers 10*a* and 10*b* corresponding to the respective frequency and the required coupling are provided. With such a structure, for the reason similar to that of the fifth embodiment, downsizing of a multi-band RF circuit module can be achieved, and also high transmission power efficiency can be attained. Furthermore, the directional couplers 10*a* and 10*b* are respectively optimized so as to have high directivity in each frequency band. Therefore, high performance under mismatch condition can be achieved for both frequencies.

Hereinabove, the present invention achieved by the inventor has been explained specifically based on the embodiments thereof. However, the invention is not restricted to those embodiments, and can be variously modified in a scope of the invention without departing from the gist thereof. For example, in the above-described embodiments, the structure including a sub-line of a vertical winding type with respect to a line-shaped main-line and the structure having a sub-line of a vertical winding type with respect to a main-line of a vertical winding type and the like have been described. Alternatively, depending on circumstances, a structure having a line-shaped sub-line with respect to a main-line of a vertical winding type is possible.

The directional coupler and the RF frequency circuit module according to the present invention is a technology particularly useful in application to a wireless communication system, such as a cellular system, in which downsizing is strongly desired. Not just for these applications, the directional coupler and the RF frequency circuit module according to the present invention can be applied widely to overall wireless communication systems, such as wireless LAN and RFID (Radio Frequency Identification).

What is claimed is:

1. A directional coupler comprising:

a main-line;

a sub-line configured to detect current flowing in the main-line; and a ground plane, wherein the sub-line includes a first line arranged to be nearer to the ground plane than is the main-line and arranged to be substantially parallel to the main-line and the ground plane;

a second line running substantially parallel to the first line and provided on an opposite side of the main-line with respect to said first line in plan view from above the ground plane, and arranged to be substantially parallel to the main-line and the ground plane;

a first vertical line having one end connected to an end portion of the first line and extending in a direction away from the ground plane so as to be substantially vertical with respect to the main-line;

a third line having an end connected to another end of first vertical line and extending substantially parallel to the main-line and the ground plane, and overlapping with the first line when viewing the ground plane in plan view;

a fourth line having one end connected to an end portion of the third line, extending to an opposite side of the main-line with respect to said third line in plan view from above the ground plane, and being substantially parallel to the ground plane;

a fifth line having one end connected to another end of fourth line, extending substantially parallel to the main-line and the ground plane, and overlapping with the second line when viewing the ground plane in plan view; and a second vertical line having one end connected to an end portion of the fifth line, extending in a direction away from the ground plane so as to be substantially vertical with respect to the main-line, and being connected to an end portion of the second line, and wherein the directional coupler is constructed so that the first line to the fifth line and the first and second vertical lines of the sub-line form a loop, said loop being disposed to that a main component of a magnetic field vector vertically penetrating the loop is horizontal with respect to the ground plane.

2. The directional coupler according to claim 1, wherein the first and second lines in which the sub-line runs in parallel in a direction of the same electric current flowing in the main-line and/or the sub-line in maximum times in the loop are disposed at a position farther from the ground plane than are other lines other than the first and second lines, and a portion of the main-line and a portion of the sub-line contributing to a coupling between the main-line and the sub-line are disposed at a position farther from the ground plane than are the first and second lines or at a position in approximately equal distance from the ground plane to the first section.

3. The directional coupler according to claim 1, wherein n lines are provided in parallel with the main-line between the main-line and the ground plane (n is an integer equal to or greater than 2), (n−1) lines are provided between the n lines and the ground plane, and the n lines and the (n−1) lines are connected so that directions of currents flowing in the n lines are equal to each other to form the sub-line.

4. The directional coupler according to claim 1, wherein m lines are provided at a position farther from the ground plane than the sub-line and in parallel with the sub-line (m is an integer equal to or greater than 2), (m−1) lines are provided between the sub-line and the ground plane, wherein a distance between the m lines and the ground plane is larger than a distance between the sub-line and the ground plane, and wherein the m lines and the (m−1) lines are connected so that directions of currents flowing in the m lines are equal to each other to form the main-line.

5. The directional coupler according to claim 1, wherein the main-line and the sub-line are formed over or inside the same multi-layer substrate, and the ground plane is disposed over or inside a motherboard having the multi-layer substrate mounted thereon.

* * * * *